March 21, 1967   A. I. APPLETON   3,310,264
QUICK MOUNTING HANGER FOR PIPE AND CONDUIT
Filed Oct. 13, 1966
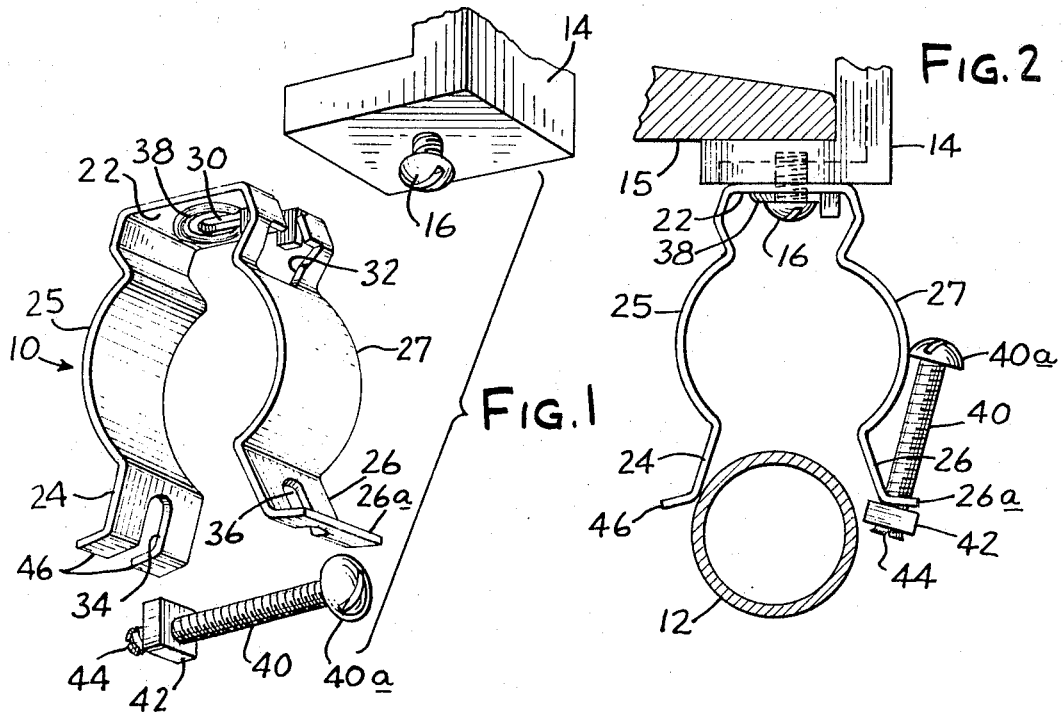
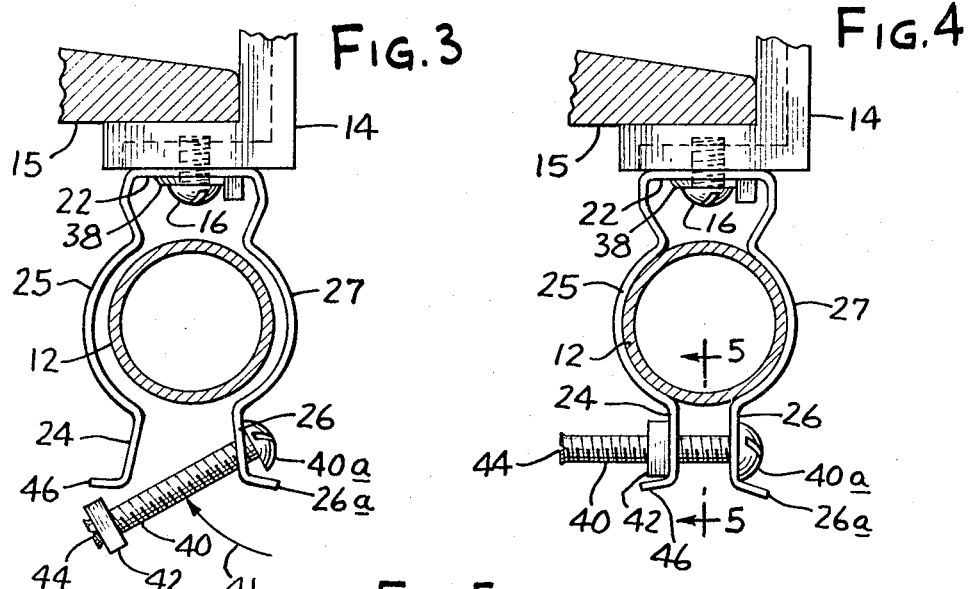
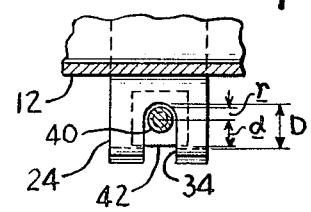
INVENTOR
ARTHUR I. APPLETON
by: Wolfe, Hubbard, Voit & Osann
ATTYS.

United States Patent Office 3,310,264
Patented Mar. 21, 1967

3,310,264
QUICK MOUNTING HANGER FOR PIPE AND CONDUIT
Arthur I. Appleton, Northbrook, Ill.
(1701 Wellington Ave., Chicago, Ill. 60657)
Filed Oct. 13, 1966, Ser. No. 586,423
3 Claims. (Cl. 248—72)

This application is a continuation in part of prior copending application Ser. No. 507,202 filed Nov. 10, 1965, now abandoned and relates to improved devices for attaching pipe, conduit, tubing, and the like to fixed supports such as overhead beams or other structural members. The invention finds particular but not exclusive use as a hanger for electrical conduits.

Previous devices of this type have required the use of two hands for installation. For example, with the device disclosed in applicant's prior U.S. Patent No. 3,185,418, issued on May 25, 1965. wherein a pipe is secured within a hanger by means of a screw and a nut mounted thereon, it is necessary that one hand hold the screw while the other hand unscrews the nut to allow the pipe to slip into engagement with the device. Then, one hand reinserts the screw into the hanger while the other hand tightens the nut. The need to use both hands is a disadvantage because the mechanic or electrician installing the device is usually on a scaffold or ladder.

Accordingly, it is an object of this invention to provide an improved hanger device which requires only one hand to install and to connect a pipe thereto.

Other objects and advantages of the present invention will become apparent from reading the following description and upon reference to the attached drawings in which:

FIGURE 1 is an exploded perspective view of an illustrative hanger constructed according to the invention;

FIG. 2 is an end elevation, partly in section, of the hanger of FIG. 1 with the bolt in retracted position and with the pipe section about to be inserted;

FIG. 3 is an end elevation similar to FIG. 2 illustrating the next step, with the pipe section in place within the hanger and with the bolt about to be swung into its operative position;

FIG. 4 is an end elevation similar to FIG. 3 illustrating the hanger engaging the pipe section after the nut has been tightened on the bolt; and FIG. 5 is a vertical section taken along the line 5—5 in FIG. 4 and showing the position of the bolt and of the nut with respect to one of the arms of the hanger.

While the invention is susceptible of various modifications and alternative constructions, there is shown in the drawings and will herein be described in detail one preferred embodiment. It is to be understood, however, that it is not thereby intended to limit the invention to the specific form disclosed. On the contrary, it is intended to cover all modifications and alternative constructions falling within the spirit and scope of the invention as expressed in the appended claims.

Turning now to the drawings, FIG. 1 illustrates a hanger 10 constructed according to the invention and arranged to hold a pipe section 12 to a beam clip 14 which in turn may be attached to an I-beam 15 by any suitable means. The hanger 10 is supported in depending relation from the clip 14 by a mounting screw 16 and may be slid into engagement with the head of the latter during installation. The hanger 10 is similar to that disclosed in Patent No. 3,185,418 referred to earlier, and comprises a webbed portion 22 joining two legs 24 and 26, each having a portion bowed at 25 and 27 respectively to engage the pipe section 12 as shown in FIG. 4. Apertures 30 and 32 are formed in the top of the web 22 and the side of leg 26 to allow the hanger to engage the mounting screw 16. When the screw 16 is tightened, it seats against a rib 38 formed in the web 22 around the aperture 30 thus holding the hanger rigidly. It will be appreciated that connection of the hanger 10 to the clip 14 in the foregoing manner requires the use of only one hand.

In accordance with the invention, provision is made for further connecting the hanger 10 to the pipe or conduit section 12 so as to still require the use of only one hand. In carrying out this aspect of the invention, the leg 26 is formed within an elongated aperture 36 adjacent its end. A clamping bolt 40 passes through the aperture 36. The bolt has a head 40a at one end so as to anchor the bolt against one of the legs of the hanger. Engagement between the bolt 40 and the other leg of the hanger is provided by a flat sided nut 42 on the bolt. To prevent accidental loss of the nut 42, the end of the bolt 40 is staked, as indicated at 44.

Insertion of the pipe 12 within the bowed arms 24 and 26 of the hanger 10 is facilitated by the extension of the aperture 36 into the outwardly turned end 26a of the leg 26. The terminal portion of the aperture 36, extending into the end 26a of the arm 26, provides a recess into which the bolt 40 may be withdrawn so as to locate both it and the nut 42 out of the way of the pipe 12 that is to be inserted within the hanger, as shown in FIG. 2.

In order to allow the clamping bolt 40 to be inserted into the opposite leg 24 after a pipe section has been located within the bowed portions 25 and 27, as in FIG. 3, a slot 34 is formed in that leg. The slot 34 originates at the lower end of the leg 24 and extends towards but terminates short of the bowed portion 25 of the leg. Thus, to tighten the legs 24 and 26 of the hanger 10 on the pipe 12, the bolt 40 need only be pivoted into the slot 34 along the arc 41 are indicated in FIG. 3, until it is securely seated in the slot This may be done conveniently with the fingers of one hand. Thus, the legs 24 and 26 may be pressed together with the index finger and thumb of one hand and the bolt 42 is swung upward with the middle finger of the same hand. Thereafter, the bolt and nut are tightened to the positions shown in FIG. 4.

To permit the final tightening operation to be performed by one hand also, means are provided for engaging the nut 42 to prevent it from rotating while the bolt 40 is being turned. To this end, flanges 46 are formed at the very end of the leg 24 by bending the leg outwardly. Further, the dimension D of the slot 34, that is, the distance from the upper end of the slot to the root of the flanges 46, is made only slightly greater than the sum of the radius $r$ of the bolt 40 and the dimension $d$ of the nut 42, the latter dimension being the distance from the longitudinal axis of the bolt 40 to the flat side of the nut 42. Given these dimensions, the flanges 46 cooperate with the upper end of the slot 34 to prevent the nut 42 from turning with the bolt 40 during the tightening operation since any tendency of the nut 42 to turn would cause the bolt to be pivoted on the corner of the nut against the upper end of the slot 34.

It should be noted that, although the provision of a slot of limited length offers a convenient means for cooperating wtih the flanges 46 to prevent the nut 42 from turning with the bolt 40, other means for cooperating with the flanges to accomplish the same purpose may be employed. Thus, a ridge might be formed on the leg 24 just above the upper flat surface of the nut 42. It should also be noted that, although in the illustrated exemplary embodiment, the invention has been shown with the head 40a of the bolt 40 being tightened against the apertured arm 26, and the nut 42 being tightened against the slotted arm 24, the invention could also be employed with the position of the bolt reversed, so that the nut 42 is tightened against the apertured arm 26 and the head 40a of the bolt 40 is tightened against the slotted arm 24. Thus, the locking function previously performed by the flanges 46 of the arm 24 could also be performed by the end 26a of the arm 26. This is particularly so if the length of the aperture 36 is chosen to have the same relationship with respect to the radius $r$ of the bolt 40 and the dimension $d$ of the bolt 42 as does the slot 34 in the illustrated embodiment as shown in FIG. 5.

I claim as my invention:

1. In a hanger for sections of pipe, tubing, and the like having a web and a pair of legs joined thereto for engagement with the section to be supported, the improvement comprising in combination
   (1) an aperture through and adjacent the end of one of said legs,
   (2) a clamping bolt through said aperture,
      (a) said bolt being staked at one end and having a head at the opposite end,
   (3) a flat sided nut on said bolt intermediate its staked end and said one leg,
      (a) the end of said leg, including an apertured portion thereof, being turned outwardly to provide a recess for said bolt,
   (4) a slot originating at the end of the other one of said legs, running along said leg towards but terminating short of said web so as to receive and seat said clamping bolt, and
   (5) flanges formed by turning the ends of said other leg outwardly to provide a stop surface for said nut.

2. The hanger of claim 1 wherein the distance between the root of the flanges and the end of the slot on said other leg is slightly greater than the sum of the radius of said bolt and the distance from the axis of the bolt to a flat side of said nut.

3. In a hanger for sections of pipe, tubing, and the like, having a web and a pair of legs joined thereto for engagement with the section to be supported, the improvement comprising in combination
   (1) an aperture through and adjacent the end of one of said legs,
   (2) a slot originating at the end of the other one of said legs and running along said leg toward said web, both of said legs being turned outwardly, with the outwardly turned portion of the apertured leg including a terminal portion of the aperture,
   (3) a bolt through said aperture, said bolt being staked at one end and having a head on the other end, and
   (4) a flat sided nut on said bolt intermediate its ends.

References Cited by the Examiner

UNITED STATES PATENTS

| | | | |
|---|---|---|---|
| 1,002,761 | 9/1911 | Salmini | 248—71 |
| 1,760,458 | 5/1930 | Weber | 248—74 |
| 1,963,908 | 6/1934 | Manasek | 248—74 |
| 3,125,177 | 3/1964 | Paller | 248—361 X |
| 3,167,286 | 1/1965 | Sherburne | 248—62 |
| 3,185,418 | 5/1965 | Appleton | 248—72 |

CLAUDE A. LE ROY, *Primary Examiner.*